US012567594B2

(12) United States Patent
Aono et al.

(10) Patent No.: US 12,567,594 B2
(45) Date of Patent: Mar. 3, 2026

(54) SEPARATOR FOR FUEL CELL AND SINGLE CELL FOR FUEL CELL

(71) Applicant: TOYOTA BOSHOKU KABUSHIKI KAISHA, Aichi-ken (JP)

(72) Inventors: Haruyuki Aono, Aichi-ken (JP); Satoshi Kawabe, Ichinomiya (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 681 days.

(21) Appl. No.: 17/882,084

(22) Filed: Aug. 5, 2022

(65) Prior Publication Data

US 2023/0049976 A1     Feb. 16, 2023

(30) Foreign Application Priority Data

Aug. 10, 2021     (JP) ................................. 2021-130767
Aug. 10, 2021     (JP) ................................. 2021-130768

(51) Int. Cl.
*H01M 8/026*         (2016.01)
*H01M 8/0267*       (2016.01)
*H01M 8/10*           (2016.01)

(52) U.S. Cl.
CPC ......... *H01M 8/026* (2013.01); *H01M 8/0267* (2013.01); *H01M 2008/1095* (2013.01)

(58) Field of Classification Search
None
See application file for complete search history.

(56) References Cited

U.S. PATENT DOCUMENTS

2004/0058218 A1*   3/2004   Atbi ...................... H01M 8/241
                                                                        429/514
2004/0157111 A1*   8/2004   Sakamoto ........... H01M 8/2457
                                                                        429/444

(Continued)

FOREIGN PATENT DOCUMENTS

CN            102804468 A        11/2012
CN            112397740           2/2021
JP            2017-188346 A      10/2017

OTHER PUBLICATIONS

Office Action in counterpart Chinese Patent Application No. 202210930003.X, dated Feb. 11, 2025 (and English translation thereof).

(Continued)

*Primary Examiner* — Alix E Eggerding
(74) *Attorney, Agent, or Firm* — Greenblum & Bernstein, P.L.C.

(57)         ABSTRACT

A separator for a fuel cell includes a facing surface configured to face a power generating unit of the fuel cell. Groove passages and ribs that protrude toward the power generating unit are provided on the facing surface. At least one of the ribs includes at least one recess in a center of the rib in an arrangement direction of the groove passages. The recess includes a bottom surface, which faces the power generating unit, and two inner side surfaces, which rise from opposite ends in the arrangement direction of the bottom surface. The two inner side surfaces are inclined such that a given point on each inner side surface separates further away from the bottom surface in the arrangement direction as that point approaches the power generating unit in a direction in which the power generating unit and the separator face each other.

16 Claims, 10 Drawing Sheets

(56) References Cited

U.S. PATENT DOCUMENTS

| | | | | |
|---|---|---|---|---|
| 2005/0175883 A1* | 8/2005 | Trabold | ............ | H01M 8/04156 |
| | | | | 429/512 |
| 2006/0234107 A1* | 10/2006 | Leger | ................. | H01M 8/0258 |
| | | | | 429/514 |
| 2011/0207018 A1* | 8/2011 | Nakagawa | .......... | H01M 8/1004 |
| | | | | 429/483 |
| 2012/0107718 A1 | 5/2012 | Masaka et al. | | |
| 2019/0305327 A1* | 10/2019 | Okabe | ................. | H01M 8/0263 |
| 2021/0050604 A1 | 2/2021 | Li | | |
| 2021/0288340 A1* | 9/2021 | Nunokawa | .......... | H01M 8/0206 |
| 2023/0118637 A1* | 4/2023 | Aono | ................. | H01M 8/0247 |
| | | | | 429/514 |

OTHER PUBLICATIONS

Office Action in counterpart Chinese Patent Application No. 202210930003.X, dated Aug. 2, 2025, along with English translation.

* cited by examiner

SEPARATOR FOR FUEL CELL AND SINGLE CELL FOR FUEL CELL

BACKGROUND

1. Field

The present disclosure relates to a separator for a fuel cell and a single cell for a fuel cell.

2. Description of Related Art

Japanese Laid-Open Patent Publication No. 2017-188346 discloses a fuel cell. The fuel cell includes a membrane electrode gas diffusion layer assembly (hereinafter, referred to as MEGA) and a plastic frame member arranged at the outer periphery of the MEGA.

The fuel cell also includes an anode-side separator and a cathode-side separator, which hold, between them, the MEGA and the plastic frame member.

The MEGA includes a membrane electrode assembly (hereinafter referred to as MEA), an anode-side gas diffusion layer (hereafter referred to as GDL), and a cathode-side GDL. The anode-side GDL and the cathode-side GDL hold the MEA between them.

The separators each include groove passages, which supply oxidation gas or fuel gas (hereinafter referred to as reactant gas) to the MEGA, and ribs, which are located between the groove passages and contact the GDLs.

In this type of fuel cell, a portion of a GDL that is adjacent to a separator that faces a groove passage may be deformed to bend and sink into the groove passage. The sunk GDL acts as resistance to the flow of reactant gas through the groove passage and thus can increase a pressure loss of the reactant gas.

SUMMARY

Accordingly, it is an objective of the present disclosure to provide a separator for a fuel cell and a single cell for a fuel cell that restrict a gas diffusion layer from sinking into a groove passage.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a first general aspect, a separator for a fuel cell is provided. The separator includes a facing surface configured to face a power generating unit of the fuel cell. Groove passages through which a reactant gas flows are arranged side by side on the facing surface. Ribs, which are located between the groove passages and protrude toward the power generating unit, are provided on the facing surface. At least one of the ribs includes at least one recess in a center of the rib in an arrangement direction of the groove passages. The recess includes a bottom surface and two inner side surfaces. The bottom surface extends in a planar direction of the power generating unit and faces the power generating unit. The two inner side surfaces rise from opposite ends in the arrangement direction of the bottom surface. The two inner side surfaces are inclined such that a given point on each inner side surface separates further away from the bottom surface in the arrangement direction as that point approaches the power generating unit in a direction in which the power generating unit and the separator face each other.

In the first general aspect, a single cell for a fuel cell that includes two separators and a power generating unit is also provided. The power generating unit is held between the two separators and includes two gas diffusion layers respectively contacting the two separators. At least one of the two separators is the above-described separator. The power generating unit sinks into the recess.

In a second general aspect, a separator for a fuel cell is provided. The separator includes a facing surface configured to face a power generating unit of the fuel cell. Groove passages through which a reactant gas flows are arranged side by side on the facing surface. The separator includes a base member and a contact member. The base member includes the groove passages and ribs that are located between the groove passages and protrude toward the power generating unit. The contact member contacts the power generating unit. The contact member is joined to one of the ribs. The contact member includes a base portion joined to the rib and two protrusions that protrude from the base portion and are spaced apart from each other in an arrangement direction of the groove passages.

In the second general aspect, a single cell for a fuel cell is also provided. The single cell includes two separators and a power generating unit that is held between the two separators and includes two gas diffusion layers respectively contacting the two separators. At least one of the two separators is the above-described separator. The power generating unit sinks into a space between the protrusions in the base portion.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
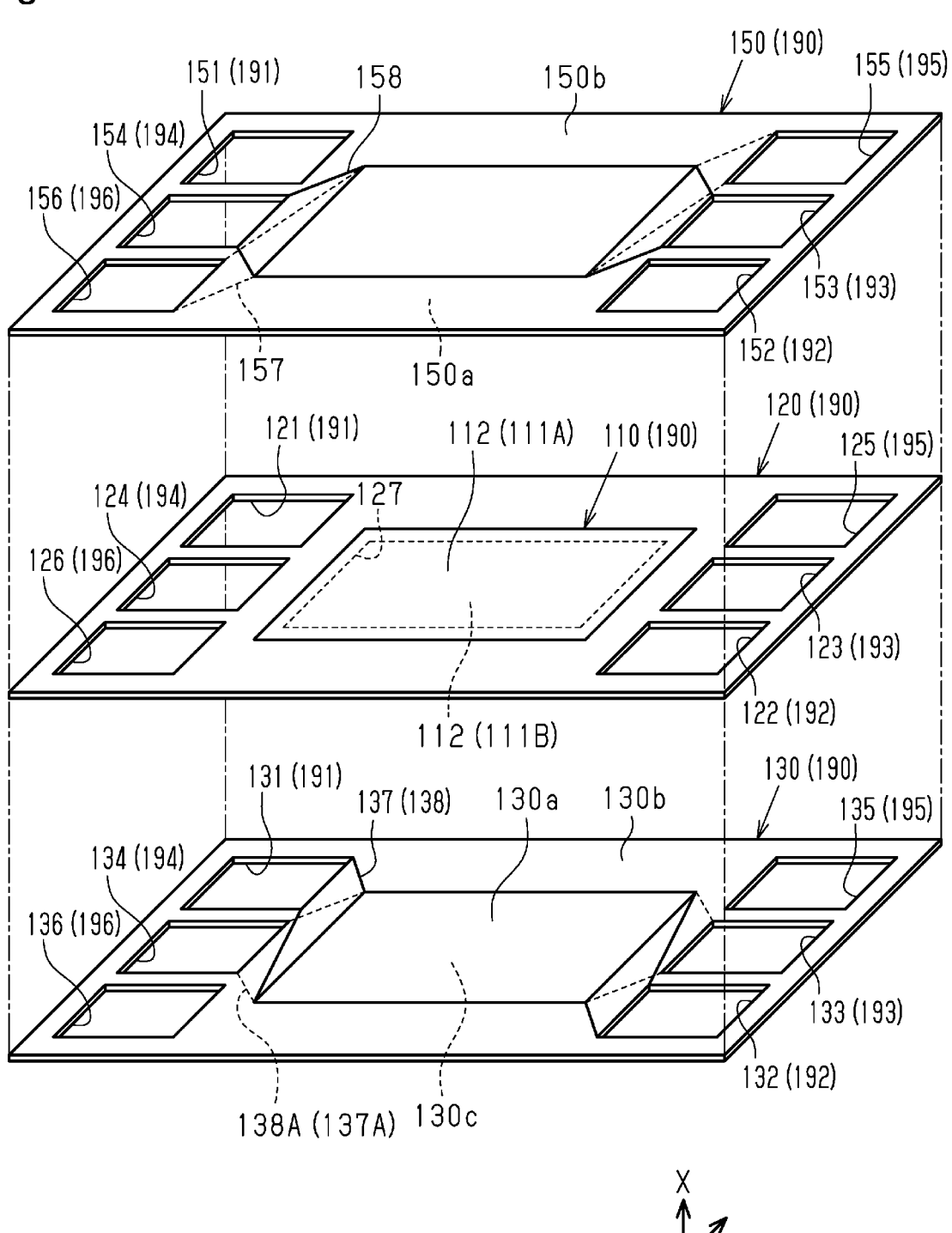
FIG. 1 is an exploded perspective view of a single cell for a fuel cell that includes separators for a fuel cell according to a first embodiment.

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

First Embodiment

A separator for a fuel cell and a single cell for a fuel cell according to a first embodiment will now be described with reference to FIGS. 1 to 6. For illustrative purposes, some parts of the structures in the drawings are exaggerated or simplified, and the dimensional ratios of the structures may be different from the actual ratios.

<Overall Configuration of Single Cell 190 of Fuel Cell Stack>

As shown in FIG. 1, a single cell 190 for a fuel cell stack includes a membrane electrode assembly 110 (hereinafter, referred to as MEA 110), a frame member 120, which supports the MEA 110, and two separators 130, 150, which hold the MEA 110 and the frame member 120 between them.

The single cell 190 is a rectangular plate as a whole.

In the following description, the direction in which the separator 130, the layer including the MEA 110 and the frame member 120, and the separator 150 are stacked will be referred to as a first direction X.

A longitudinal direction of the single cell 190, which is orthogonal to the first direction X, will be referred to as a second direction Y.

Also, a direction that is orthogonal to both of the first direction X and the second direction Y will be referred to as a third direction Z.

The single cell 190 has inlet holes 191, 193, 195 for introducing reactant gas or cooling medium into the single cell 190, and outlet holes 192, 194, 196 for discharging the reactant gas and the cooling medium in the single cell 190 to the outside. In the present embodiment, the inlet hole 191 and the outlet hole 192 are holes through which fuel gas flows. The inlet hole 193 and the outlet hole 194 are holes through which cooling medium flows. The inlet hole 195 and the outlet hole 196 are holes through which oxidant gas flows. The fuel gas is hydrogen gas. The cooling medium is water. The oxidant gas is air.

The inlet holes 191, 193, 195 and the outlet holes 192, 194, 196 each have a rectangular shape elongated in the second direction Y in plan view, and extend in the first direction X through the single cell 190. The inlet hole 191 and the outlet holes 194, 196 are located on one side in the second direction Y of the single cell 190 (on the left side in the left-right direction in FIG. 1). The inlet hole 191 and the outlet holes 194, 196 are arranged side by side in the third direction Z while being spaced apart from each other. The outlet hole 192 and the inlet holes 193, 195 are located on the other side in the second direction Y of the single cell 190 (on the right side in FIG. 1). The outlet hole 192 and the inlet holes 193, 195 are arranged side by side in the third direction Z while being spaced apart from each other.

<MEA 110>

As shown in FIG. 1, the MEA 110 has a rectangular shape elongated in the second direction Y.

The MEA 110 includes a solid polymer electrolyte membrane (not shown; hereinafter referred to as an electrolyte membrane) and electrodes 111A, 111B respectively provided on opposite surfaces of the electrolyte membrane. In the present embodiment, the electrode that is joined to one side in the first direction X (the upper side in the up-down direction in FIG. 1) of the electrolyte membrane (not shown) is a cathode 111A. Also, the electrode joined to the other side in the first direction X (the lower side in the in FIG. 1) of the electrolyte membrane is an anode 111B.

The electrodes 111A, 111B each include a catalyst layer (not shown) joined to the electrolyte membrane and a gas diffusion layer 112 (hereinafter referred to as a GDL 112), which is joined to the catalyst layer.

The MEA 110 corresponds to a power generating unit of the fuel cell according to the present disclosure.

<Frame Member 120>

As shown in FIG. 1, the frame member 120 has a rectangular shape elongated in the second direction Y.

The frame member 120 is a sheet made of, for example, a plastic.

The frame member 120 includes through-holes 121, 122, 123, 124, 125, 126, which are respectively part of the holes 191, 192, 193, 194, 195, 196.

The frame member 120 includes an opening 127, which has a rectangular shape elongated in the second direction Y, in a center. The MEA 110 is joined to the edge of the opening 127 from one side in the first direction X (upper side as viewed in FIG. 1). That is, the frame member 120 is located at an outer periphery of the MEA 110.

<Separator 130>

Figure 2:
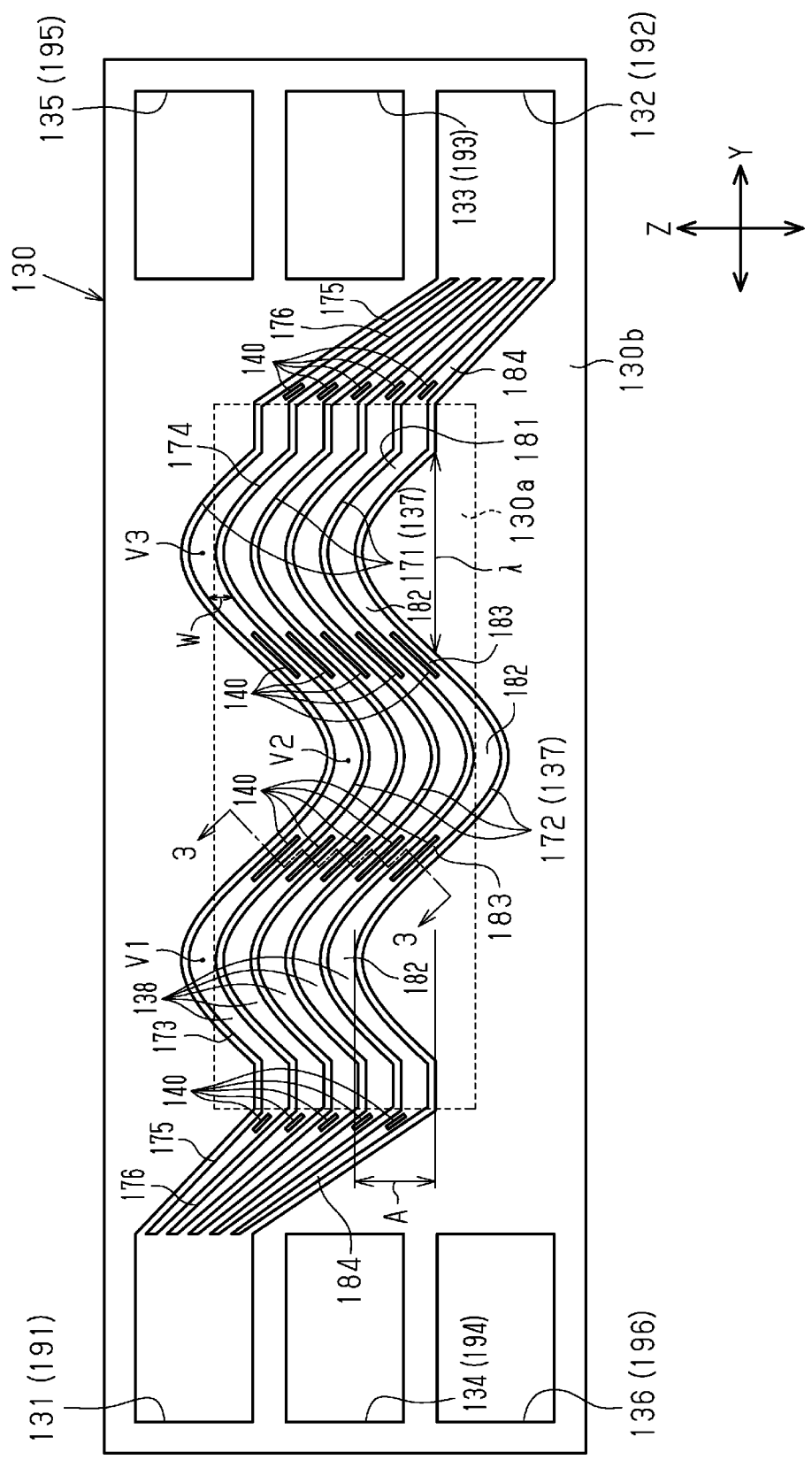
FIG. 2 is a plan view illustrating a separator according to the first embodiment.

As shown in FIGS. 1 and 2, the separator 130 is a rectangular plate elongated in the second direction Y.

The separator 130 is formed by pressing, for example, a metal member made of titanium or stainless steel.

The separator 130 is provided on the side of the MEA 110 on which the anode 111B is provided (refer to FIG. 1).

The separator 130 includes an inner facing surface 130a, which faces the MEA 110, and an outer facing surface 130b, which faces the frame member 120.

The separator 130 includes through-holes 131, 132, 133, 134, 135, 136, which are respectively part of the holes 191, 192, 193, 194, 195, 196. In the third direction Z, the through-holes 131, 134, 136 are provided at positions that correspond to the through-holes 121, 124, 126 of the frame member 120. Also, in the third direction Z, the through-holes 132, 133, 135 are provided at positions that correspond to the through-holes 122, 123, 125 of the frame member 120.

The separator 130 includes groove passages 137, through which fuel gas flows, and ribs 138 located between the groove passages 137. FIG. 1 illustrates, in a simplified manner, the outer edge of a section that includes the groove passages 137 and the ribs 138.

<Groove Passage 137>

As shown in FIG. 2, the groove passages 137 connect the through-hole 131 and the through-hole 132 to each other. In the present embodiment, the groove passages 137, of which there are six, are arranged side by side in the third direction Z while being spaced apart from each other.

The width, that is, the cross-sectional flow area of each groove passage 137 is constant over the entire groove passage 137 in the extending direction. The groove passages 137 have the same width.

The six groove passages 137 include three first groove passages 171 and three second groove passages 172. The first groove passages 171 and the second groove passages 172 are arranged alternately in the third direction Z.

Each first groove passage 171 includes a wavy section 173, which is provided on the inner facing surface 130a, and extending sections 175, which extend from the wavy section 173 into the outer facing surface 130b.

The wavy section 173 extends in a wavy shape in planar directions of the inner facing surface 130a. A wavelength λ and an amplitude A of each wavy section 173 are constant over the entire wavy section 173 in the extending direction. The wavenumber of each wavy section 173 is three.

The extending sections 175 extend linearly toward the through-holes 131, 132 from opposite ends in the extending direction of the wavy section 173.

Each second groove passage 172 includes a wavy section 174, which is provided on the inner facing surface 130a, and extending sections 176, which extend from the wavy section 174 into the outer facing surface 130b. In the present embodiment, the wavy section 174 has the same waveform as the wavy section 173.

The extending sections 176 extend linearly toward the through-holes 131, 132 from opposite ends in the extending direction of the wavy section 174.

The outermost groove passages 137 in the third direction Z include sections that are located outside the outer edge of the inner facing surface 130a in the third direction Z.

<Ribs 138>

Figure 3:
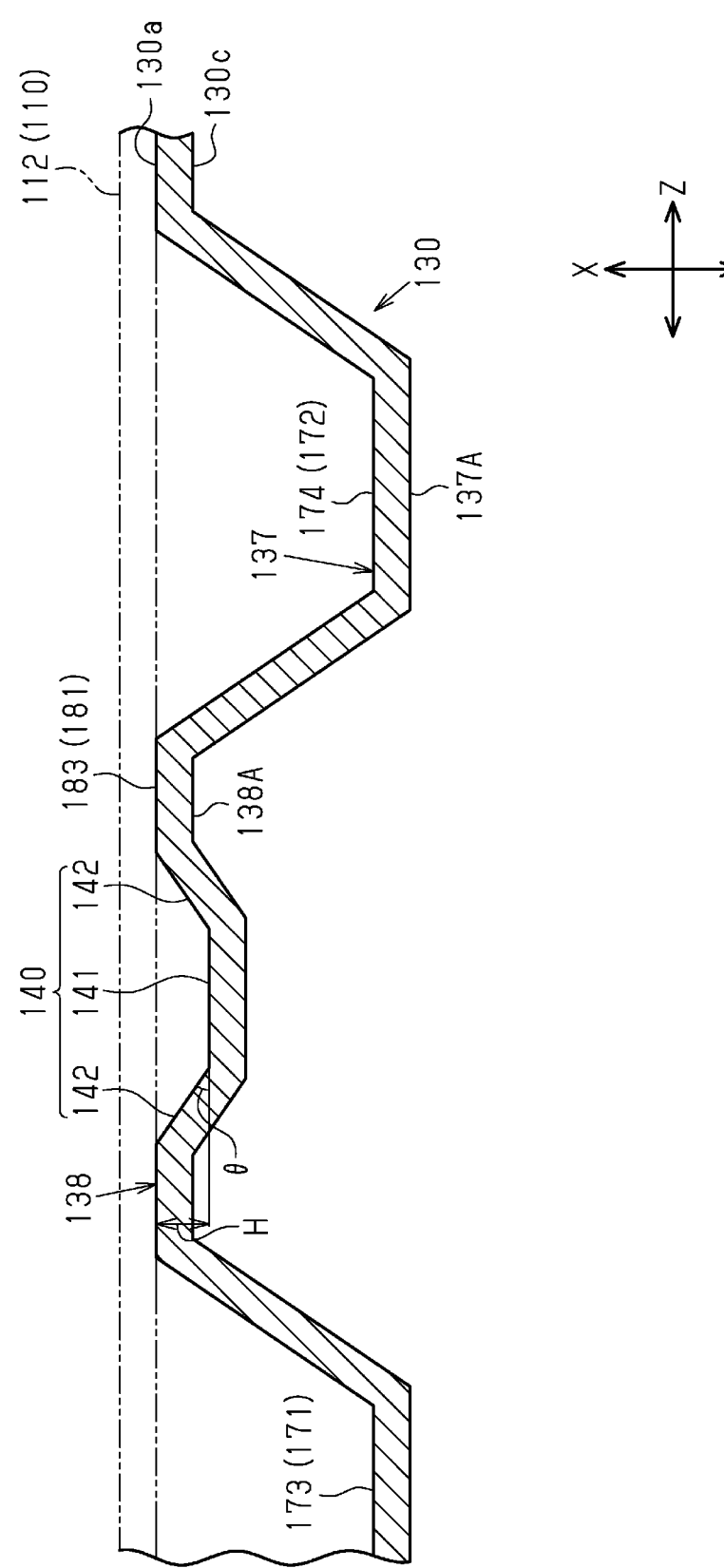
FIG. 3 is a cross-sectional view taken along line 3-3 of FIG. 2.

As shown in FIG. 3, the ribs 138 project toward one side in the first direction X (upward in the up-down direction as viewed in FIG. 3).

In the present embodiment, the ribs 138, of which there are five, are arranged side by side in the third direction Z while being spaced apart from each other, as shown in FIG. 2.

Each rib 138 includes a wavy section 181, which is provided on the inner facing surface 130a, and extending sections 184, which extend from the wavy section 181 into the outer facing surface 130b. In the present embodiment, the outermost wavy sections 181 in the third direction Z include sections that are located outside the outer edge of the inner facing surface 130a.

Each wavy section 181 includes narrow sections 183 of which a width W in the third direction Z is less than other sections of the wavy section 181 (hereinbelow, referred to as general sections 182). In the present embodiment, the narrow sections 183 are located, in the extending direction of the wavy sections 181, between an apex V1 and an apex V2 of the wavy sections 181 and between the apex V2 and an apex V3 of the wavy sections 181.

As shown in FIG. 3, each rib 138 includes recesses 140, which open toward MEA 110. The recesses 140 are each provided in a center of the rib 138 in the third direction Z.

Each recess 140 includes a bottom surface 141, which extends in planar directions of the MEA 110 and faces the MEA 110, and two inner side surfaces 142, which rise from opposite ends in the third direction Z of the bottom surface 141.

A height H from the bottom surface 141 to the distal end of the rib 138 is preferably within a range between 10 μm and 30 μm, inclusive. The height H is more preferably within a range between 20 μm and 30 μm, inclusive. In the present embodiment, the height H is set to be within the range between 20 μm and 30 μm, inclusive.

The two inner side surfaces 142 are inclined such that a given point on each inner side surface 142 separates further away from the bottom surface 141 in the third direction Z as that point approaches the MEA 110 in the first direction X.

The inclination angle θ of the two inner side surfaces 142 relative to the bottom surface 141 is preferably within a range between 1 degree and 5 degrees, inclusive. The inclination angle θ is more preferably within a range between 2 degrees and 5 degrees, inclusive. The inclination angle θ is further preferably within a range between 3 degrees and 5 degrees, inclusive. The inclination angle θ is further more preferably within a range between 4 degrees and 5 degrees, inclusive. In the present embodiment, the inclination angle θ is set to be within the range between 4 degrees and 5 degrees, inclusive.

As shown in FIG. 2, the recesses 140 are provided at multiple positions (four positions in the present embodiment) in the extending direction of each rib 138. Two of the four recesses 140 are provided in the wavy section 181 of the rib 138. Specifically, the recesses 140 are respectively provided in the two narrow sections 183. The remaining two recesses 140 are provided in the extending sections 184 of the rib 138. The recesses 140 are respectively provided in the extending section 184 that extends to the through-hole 131 and the extending section 184 that extends to the through-hole 132.

<Groove Passages 138A, Ribs 137A>

As shown in FIGS. 1 and 3, the separator 130 includes a surface 130c on a side opposite to the facing surfaces 130a, 130b in the first direction X. Groove passages 138A, through which cooling medium flows, and ribs 137A located between the groove passages 138A are provided on the surface 130c. The ribs 137A are formed by the back surfaces of the groove passages 137. The groove passages 138A are formed by the back surfaces of the ribs 138. That is, the ribs 137A and the groove passages 138A are in a back-to-back relationship with the groove passages 137 and the ribs 138 on the facing surfaces 130a, 130b (refer to FIG. 3). FIG. 1 illustrates, in a simplified manner, the outer edge of a section that includes the groove passages 138A and the ribs 137A.

The groove passages 138A connect the through-hole 133 and the through-hole 134 to each other. In the groove passages 138A, cooling medium flows in a direction opposite to the flowing direction of the fuel gas flowing through the groove passages 137.

<Separator 150>

As shown in FIG. 1, the separator 150 is a rectangular plate elongated in the second direction Y.

The separator 150 is formed by pressing, for example, a metal member made of titanium or stainless steel.

The separator 150 is provided on the side of the MEA 110 that corresponds to the cathode 111A. The separator 150 includes a first surface 150a, which includes a surface facing the MEA 110, and a second surface 150b, which is on a side opposite to the first surface 150a.

The separator 150 includes through-holes 151, 152, 153, 154, 155, 156, which are respectively part of the holes 191, 192, 193, 194, 195, 196. In the third direction Z, the through-holes 151, 154, 156 are provided at positions that correspond to the through-holes 121, 124, 126 of the frame member 120. Also, in the third direction Z, the through-holes 152, 153, 155 are provided at positions that correspond to the through-holes 122, 123, 125 of the frame member 120.

As shown in FIG. 1, the separator 150 includes groove passages 157 through which oxidant gas flows and groove passages 158 through which cooling medium flows. FIG. 1 illustrates, in a simplified manner, the outer edge of a section in the separator 150 that includes the groove passages 157 and the outer edge of a section in the separator 150 that includes the groove passages 158.

The groove passages 157 connect the through-hole 155 and the through-hole 156 to each other. In the groove passages 157, the oxidant gas flows in a direction opposite to the flowing direction of the fuel gas flowing through the groove passages 137.

The groove passages 158 connect the through-hole 153 and the through-hole 154 to each other. In the groove passages 158, the cooling medium flows in the same direction as the flowing direction of the oxidant gas flowing through the groove passages 157.

Operation of the first embodiment will now be described.

Figure 4:
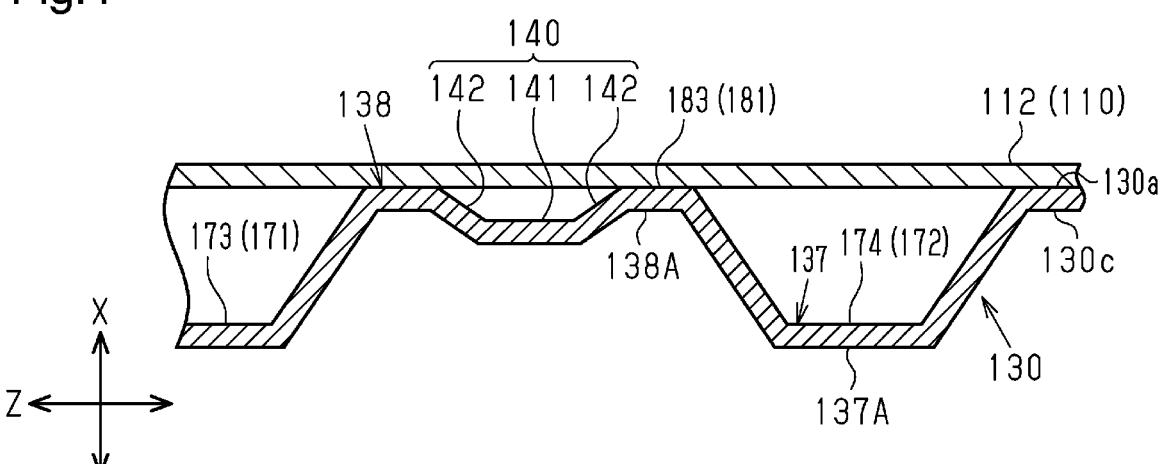
FIG. 4 is a cross-sectional view illustrating a state in which a power generating unit is stacked on a separator according to the first embodiment.
Figure 5:
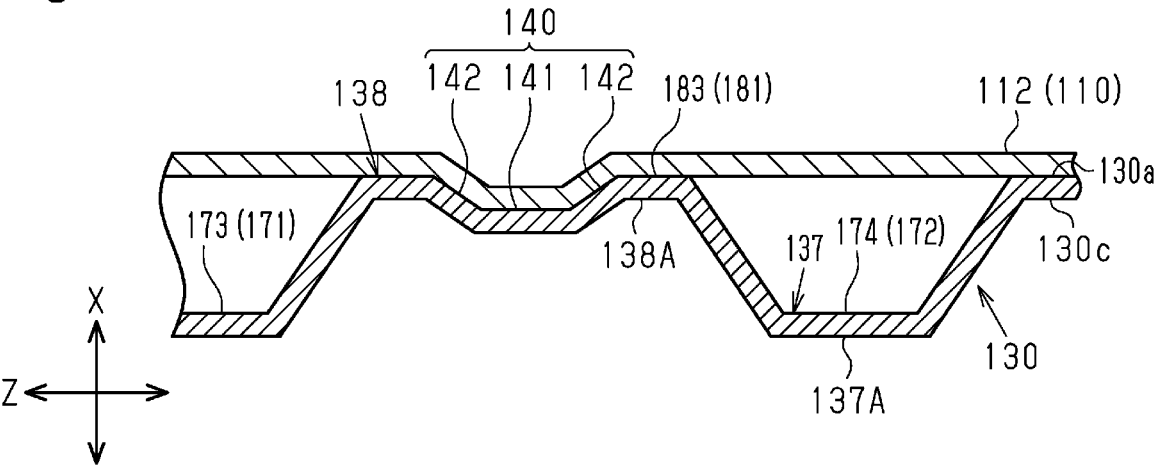
FIG. 5 is a cross-sectional view illustrating a GDL sinking into a recess of a rib.

As shown in FIGS. 4 and 5, when the separator 130 and the layer including the MEA 110 and the frame member 120 are stacked together to produce the single cell 190 for a fuel cell, the GDL 112 sinks into the recess 140 along the two inner side surfaces 142 on the inner facing surface 130a of the separator 130. Also, the GDL 112 comes into contact with the bottom surface 141 of the recess 140. As a result, a section of the GDL 112 that faces the groove passage 137 is in a taut state. FIGS. 4 and 5 illustrate only the GDL 112 in the MEA 110.

Figure 6:
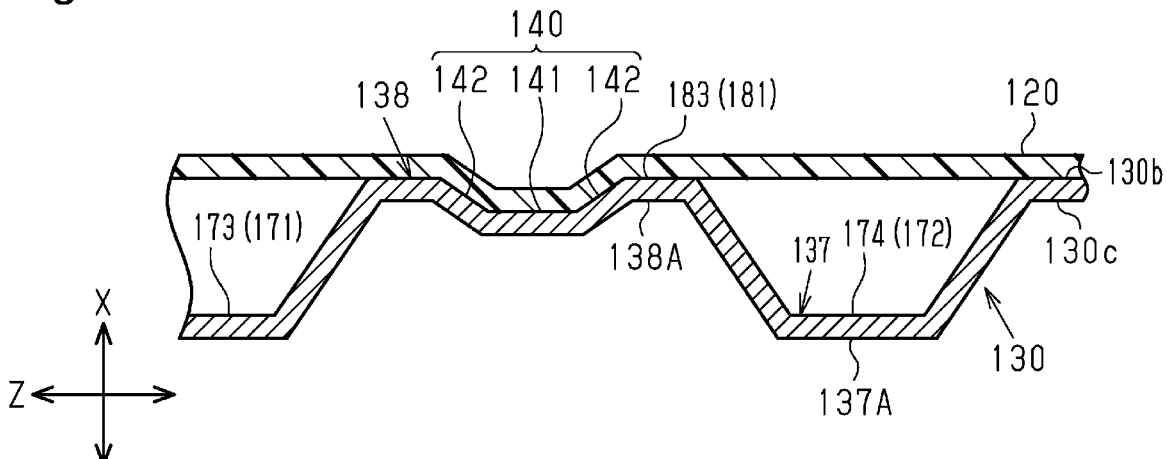
FIG. 6 is a cross-sectional view illustrating a frame member sinking into a recess of a rib.

On the other hand, the frame member 120 sinks into the recess 140 along the two inner side surfaces 142 on the outer facing surface 130b of the separator 130 as shown in FIG. 6. Also, the frame member 120 comes into contact with the bottom surface 141 of the recess 140. As a result, a section of the frame member 120 that faces the groove passage 137 is in a taut state.

The first embodiment has the following advantages.

(1) The separator 130 includes the inner facing surface 130a, which is configured to face the MEA 110 of the fuel cell. The ribs 138, which are located between the groove passages 137 and protrude toward the MEA 110, are provided on the inner facing surface 130a. Each rib 138 includes the recesses 140 in the center of the rib 138 in the third direction Z. The recess 140 includes the bottom surface 141, which extends in planar directions of the MEA 110 and faces the MEA 110, and the two inner side surfaces 142, which rise from the opposite ends in the third direction Z of the bottom surface 141. The two inner side surfaces 142 are inclined such that a given point on each inner side surface 142 separates further away from the bottom surface 141 in the third direction Z as that point approaches the MEA 110 in the first direction X.

This configuration operates in the above-described manner. The GDL 112 is thus restricted from sinking into the groove passages 137.

(2) The height H from the bottom surface 141 of the recess 140 to the distal end of the rib 138 is within a range between 20 μm and 30 μm, inclusive. The inclination angle θ of the two inner side surfaces 142 relative to the bottom surface 141 is within a range between 4 degrees and 5 degrees, inclusive.

This configuration reliably restricts a clearance from being created between the bottom surface 141 of the recess 140 and the GDL 112 while achieving the advantage of item (1) in a favorable manner.

(3) The recesses 140 are provided on the inner facing surface 130a at multiple positions in the extending direction of the ribs 138.

This configuration achieves the advantage of item (1) at multiple positions in the extending direction of the ribs 138. The GDL 112 is thus further restricted from sinking into the groove passage 137.

(4) The groove passages 137 include the first groove passages 171 and the second groove passages 172, which extend in wavy shapes in planar directions of the inner facing surface 130a and are adjacent to each other in the third direction Z. The ribs 138 include the wavy sections 181 located between the first groove passages 171 and the second groove passages 172. Each wavy section 181 includes the narrow sections 183, of which the width W in the third direction Z is less than the general sections 182 of the wavy section 181. The recesses 140 are provided in the narrow sections 183.

The GDL 112 is more likely to sink into the groove passages 137 as the width W in the third direction Z of the ribs 138 adjacent to the groove passages 137 decreases. In this regard, the above-described configuration includes the recesses 140 in the narrow sections 183 of the ribs 138. This allows the GDL 112 to be in a taut state in sections of the first groove passages 171 and the second groove passages 172 that are adjacent to the narrow sections 183, that is, in sections in which the GDL 112 is likely to sink into the groove passages 137. The GDL 112 is thus restricted from sinking into the groove passages 137.

According to the above-described configuration, the separator 130 includes the first groove passages 171 and the second groove passages 172, which extend in wavy shapes. Thus, as compared to a case in which the groove passages 137 of the separator 130 extend linearly in planar directions of the inner facing surface 130a, the separator 130 of a single cell 190 and the separator 150 of another single cell 190 contact each other in a large area when the single cells 190 are stacked. This increases the stability of the contacting structure of the adjacent separators 130, 150 and thus increases the stability of the contacting structure of the single cells 190.

(5) The recess 140 are respectively provided in the multiple ribs 138.

With this configuration, the GDL 112 is restricted from sinking into each of the multiple groove passages 137.

(6) The separator 130 includes the outer facing surface 130b, which faces the frame member 120. The groove passages 137 include the extending sections 175, 176, which extend into the outer facing surface 130b. The ribs 138 include the extending sections 184, which extend into the outer facing surface 130b. The recesses 140 include recesses 140 provided in the extending sections 184 of the ribs 138.

In the fuel cell, the MEA 110 is held by the frame member 120, which is located at the outer periphery of the MEA 110. If the frame member 120 is made of a plastic, portions of the frame member 120 that faces the groove passages 137 may be deformed to bend and sink into the groove passages 137. Like the GDL 112, the sunk frame member 120 acts as resistance to the flow of fuel gas through the groove passages 137 and thus can increase a pressure loss of the fuel gas.

In this regard, the above-described configuration functions in the above-described manner and thus restrict the frame member 120 from sinking into the groove passages 137.

<Modifications>

The first embodiment may be modified as follows. The first embodiment and the following modifications can be combined as long as the combined modifications remain technically consistent with each other.

The shapes of the inlet holes 191, 193, 195 and the outlet holes 192, 194, 196 are not limited to a rectangular shape in plan view as in the first embodiment. For example, the shapes of the inlet holes 191, 193, 195 and the outlet holes 192, 194, 196 may be square or stadium-shaped in plan view.

The flows of the reactant gas and the cooling medium through the holes 191, 192, 193, 194, 195, 196 are not limited to those described in the first embodiment. For example, the hole 196 may be used as an inlet hole for oxidant gas, and the hole 195 may be used as an outlet hole for the oxidant gas. Accordingly, the hole 194 may be used as an inlet hole for cooling medium, and the hole 193 may be used as the outlet hole for the cooling medium. That is, the oxidant gas that flows through the groove passages 157 and the cooling medium that flows through the groove passages 138A, 158 may flow in the same direction as the fuel gas flowing through the groove passages 137.

The number of the groove passages 137 is not limited to six as described in the first embodiment, but may be less than or greater than six.

The width, that is, the cross-sectional flow area of each groove passage 137 does not necessarily need to be constant over the entire groove passage 137 in the extending direction, as long as the operation and the advantages of the present disclosure are achieved.

The separator 130 is not limited to the one described in the first embodiment, which has the structure in which the outermost groove passages 137 in the third direction Z include sections that are located outside the outer edge of the inner facing surface 130a. For example, the groove passages 137 may be located, in the third direction Z, at the same position as or on the inner side of the outer edge of the inner facing surface 130a. Accordingly, the outermost wavy sections 181 of the ribs 138 in the third direction Z may be located inside the outer edge of the inner facing surface 130a.

The recesses 140 do not necessarily need to be provided in the respective the ribs 138 as in the first embodiment, but may be provided in at least one of the ribs 138.

The separator 130 is not limited the one described in the first embodiment, which has the structure in which the recesses 140 are provided only in the narrow sections 183 in the wavy sections 181 of the ribs 138. For example, the recesses 140 may be provided in both of the narrow sections 183 of the general sections 182 in the wavy sections 181, or may be provided only in the general sections 182.

The groove passages 137 do not necessarily include the first groove passages 171 and the second groove passages 172. For example, as long as the groove passages 137 include at least one first groove passage 171 and at least one second groove passage 172 that are adjacent to each other, the groove passages 137 may include additional groove passages different from the first groove passage 171 and the second groove passage 172.

The second groove passages 172 are not limited to the ones described in the first embodiment, in which the wavy sections 174 have the same waveform as the wavy sections

173 of the first groove passages 171. That is, the wavelength λ, the amplitude A, and the wavenumber of the wavy sections 174 may be different from those of the wavy sections 173. In this case, the narrow sections 183 of the ribs 138 do not necessarily need to be located between the apex V1 and the apex V2 and between the apex V2 and the apex V3 of the wavy sections 181 as described in the first embodiment.

The shape of the first groove passages 171 is not limited to the one described in the first embodiment. That is, the first groove passages 171 are not limited to the ones in which the wavelength λ, and the amplitude A of the wavy sections 173 are constant over the entire wavy sections 173 in the extending direction. For example, three waves of each wavy section 173 may have different wavelengths λ and different amplitudes A.

The wavenumber of the wavy sections 173 is not limited to three as described in the first embodiment, but may be less than or greater than three.

Figure 7:
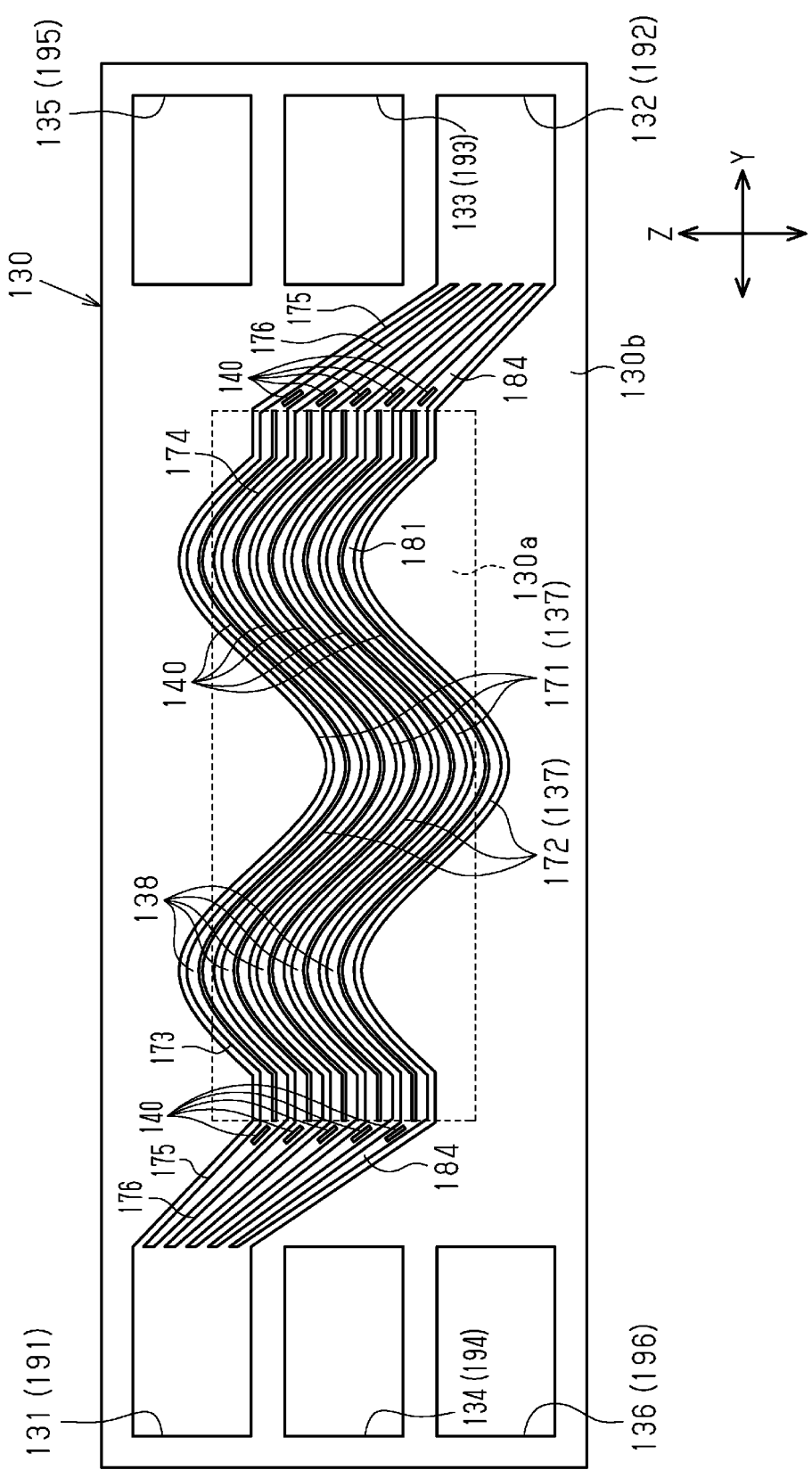
FIG. 7 is a plan view illustrating a separator according to a modification of the first embodiment.

The recesses 140 do not necessarily need to be provided on the inner facing surface 130a at multiple positions in the extending direction of the rib 138 as described in the first embodiment. That is, as shown in FIG. 7, the recesses 140 may be provided over the entire wavy sections 181 in the extending direction. In this case, the recesses 140 provided in the extending sections 184 may extend from or be independent of the recesses 140 provided in the wavy sections 181 (refer to FIG. 7). The recesses 140 may be omitted from the extending sections 184.

The shape of the groove passages 137 is not limited to the one described in the first embodiment, but may be changed in the following manner. That is, the groove passages 137 do not necessarily need to include the first groove passages 171 and the second groove passages 172, which extend in wavy shapes in planar directions of the inner facing surface 130a. For example, each groove passage 137 may be changed to extend linearly in planar directions of the inner facing surface 130a.

The separator for a fuel cell according to the present disclosure is not limited to the separator 130, which is joined to the side of the MEA 110 that corresponds to the anode 111B as described in the first embodiment, but may be employed in the separator 150, which is joined to the side corresponding to the cathode 111A.

The separators 130, 150 do not necessarily need to be formed by pressing a metal member, but may be formed by cutting or etching.

The material for the separators 130, 150 is not limited to titanium or stainless steel, but may be aluminum or carbon.

Second Embodiment

A separator for a fuel cell and a single cell for a fuel cell according to a second embodiment will now be described with reference to FIGS. 8 to 13. For illustrative purposes, some parts of the structures in the drawings are exaggerated or simplified, and the dimensional ratios of the structures may be different from the actual ratios.

<Overall Configuration of Single Cell 290 of Fuel Cell Stack>

Figure 8:
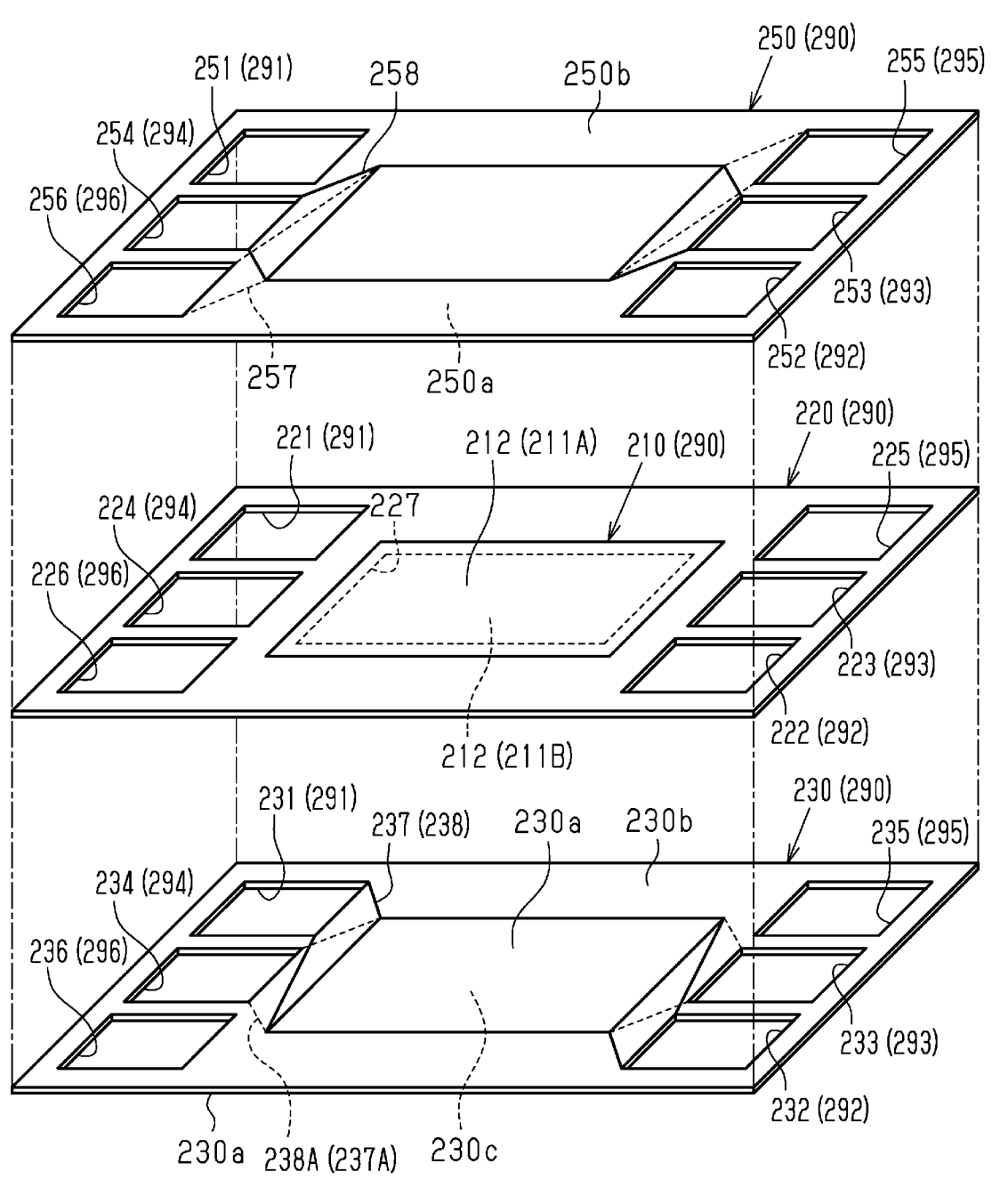
FIG. 8 is an exploded perspective view of a single cell for a fuel cell that includes separators for a fuel cell according to a second embodiment.

As shown in FIG. 8, a single cell 290 for a fuel cell stack includes a membrane electrode assembly 210 (hereinafter, referred to as MEA 210), a frame member 220, which supports the MEA 210, and two separators 230, 250, which hold the MEA 210 and the frame member 220 between them.

The single cell 290 is a rectangular plate as a whole.

In the following description, the direction in which the separator 230, the layer including the MEA 210 and the frame member 220, and the separator 250 are stacked will be referred to as a first direction X.

A longitudinal direction of the single cell 290, which is orthogonal to the first direction X, will be referred to as a second direction Y.

Also, a direction that is orthogonal to both of the first direction X and the second direction Y will be referred to as a third direction Z.

The single cell 290 has inlet holes 291, 293, 295 for introducing reactant gas or cooling medium into the single cell 290, and outlet holes 292, 294, 296 for discharging the reactant gas and the cooling medium in the single cell 290 to the outside. In the present embodiment, the inlet hole 291 and the outlet hole 292 are holes through which fuel gas flows. The inlet hole 293 and the outlet hole 294 are holes through which cooling medium flows. The inlet hole 295 and the outlet hole 296 are holes through which oxidant gas flows. The fuel gas is hydrogen gas. The cooling medium is water. The oxidant gas is air.

The inlet holes 291, 293, 295 and the outlet holes 292, 294, 296 each have a rectangular shape elongated in the second direction Y in plan view, and extend in the first direction X through the single cell 290. The inlet hole 291 and the outlet holes 294, 296 are located on one side in the second direction Y of the single cell 290 (on the left side in the left-right direction in FIG. 8). The inlet hole 291 and the outlet holes 294, 296 are arranged side by side in the third direction Z while being spaced apart from each other. The outlet hole 292 and the inlet holes 293, 295 are located on the other side in the second direction Y of the single cell 290 (on the right side in FIG. 8). The outlet hole 292 and the inlet holes 293, 295 are arranged side by side in the third direction Z while being spaced apart from each other.

<MEA 210>

As shown in FIG. 8, the MEA 210 has a rectangular shape elongated in the second direction Y.

The MEA 210 includes a solid polymer electrolyte membrane (not shown; hereinafter referred to as an electrolyte membrane) and electrodes 211A, 211B respectively provided on opposite surfaces of the electrolyte membrane. In the present embodiment, the electrode that is joined to one side in the first direction X (the upper side in the up-down direction in FIG. 8) of the electrolyte membrane (not shown) is a cathode 211A. Also, the electrode joined to the other side in the first direction X (the lower side in the in FIG. 8) of the electrolyte membrane is an anode 211B.

The electrodes 211A, 211B each include a catalyst layer (not shown) joined to the electrolyte membrane and a gas diffusion layer 212 (hereinafter referred to as a GDL 212), which is joined to the catalyst layer.

The MEA 210 corresponds to a power generating unit of the fuel cell according to the present disclosure.

<Frame Member 220>

As shown in FIG. 8, the frame member 220 has a rectangular shape elongated in the second direction Y.

The frame member 220 is a sheet made of, for example, a plastic.

The frame member 220 includes through-holes 221, 222, 223, 224, 225, 226, which are respectively part of the holes 291, 292, 293, 294, 295, 296.

The frame member 220 includes an opening 227, which has a rectangular shape elongated in the second direction Y, in a center. The MEA 210 is joined to the edge of the opening 227 from one side in the first direction X (upper side as viewed in FIG. 8). That is, the frame member 220 is located at an outer periphery of the MEA 210.

<Separator 230>

Figure 9:
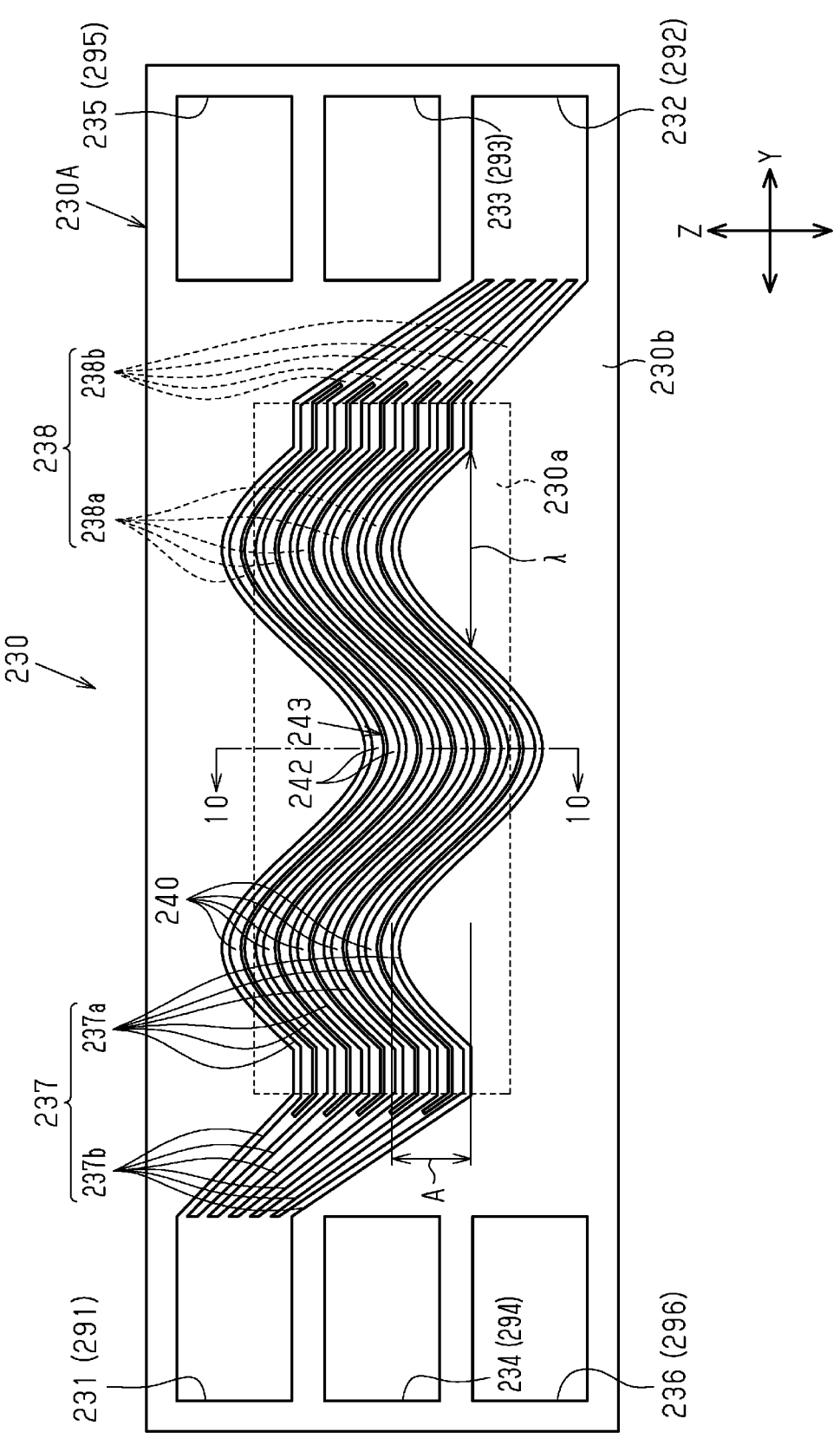
FIG. 9 is a plan view illustrating a separator according to the second embodiment.

As shown in FIGS. 8 and 9, the separator 230 is a rectangular plate elongated in the second direction Y.

The separator 230 is provided on the side of the MEA 210 on which the anode 211B is provided (refer to FIG. 8).

The separator 230 includes an inner facing surface 230a, which faces the MEA 210, and an outer facing surface 230b, which faces the frame member 220.

The separator 230 includes a base member 230A, which includes a main body of the separator 230, and contact members 240, which are formed separately from the base member 230A (refer to FIG. 9).

<Base Member 230A>

The base member 230A is formed by pressing, for example, a metal member made of titanium or stainless steel.

The base member 230A includes through-holes 231, 232, 233, 234, 235, 236, which are respectively part of the holes 291, 292, 293, 294, 295, 296. In the third direction Z, the through-holes 231, 234, 236 are provided at positions that correspond to the through-holes 221, 224, 226 of the frame member 220. Also, in the third direction Z, the through-holes 232, 233, 235 are provided at positions that correspond to the through-holes 222, 223, 225 of the frame member 220.

The base member 230A includes groove passages 237, through which fuel gas flows, and ribs 238 located between the groove passages 237. FIG. 8 illustrates, in a simplified manner, the outer edge of a section of the base member 230A that includes the groove passages 237 and the ribs 238.

As shown in FIG. 9, the groove passages 237 connect the through-hole 231 and the through-hole 232 to each other. In the present embodiment, the groove passages 237, of which there are six, are arranged side by side in the third direction Z while being spaced apart from each other.

The width, that is, the cross-sectional flow area of each groove passage 237 is constant over the entire groove passage 237 in the extending direction. The groove passages 237 have the same width.

Each groove passage 237 includes a wavy section 237a, which is provided on the inner facing surface 230a, and extending sections 237b, which extend from the wavy section 237a into the outer facing surface 230b.

The wavy section 237a extends in a wavy shape in planar directions of the inner facing surface 230a. The wavelength λ and the amplitude A of each wavy section 237a are constant over the entire wavy section 237a in the extending direction. The wavenumber of each wavy section 237a is three. In the present embodiment, the wavy sections 237a have the same waveform. In the present embodiment, the outermost wavy sections 237a in the third direction Z include sections that are located outside the outer edge of the inner facing surface 230a.

The extending sections 237b extend linearly toward the through-holes 231, 232 from opposite ends in the extending direction of the wavy section 237a.

Figure 10:
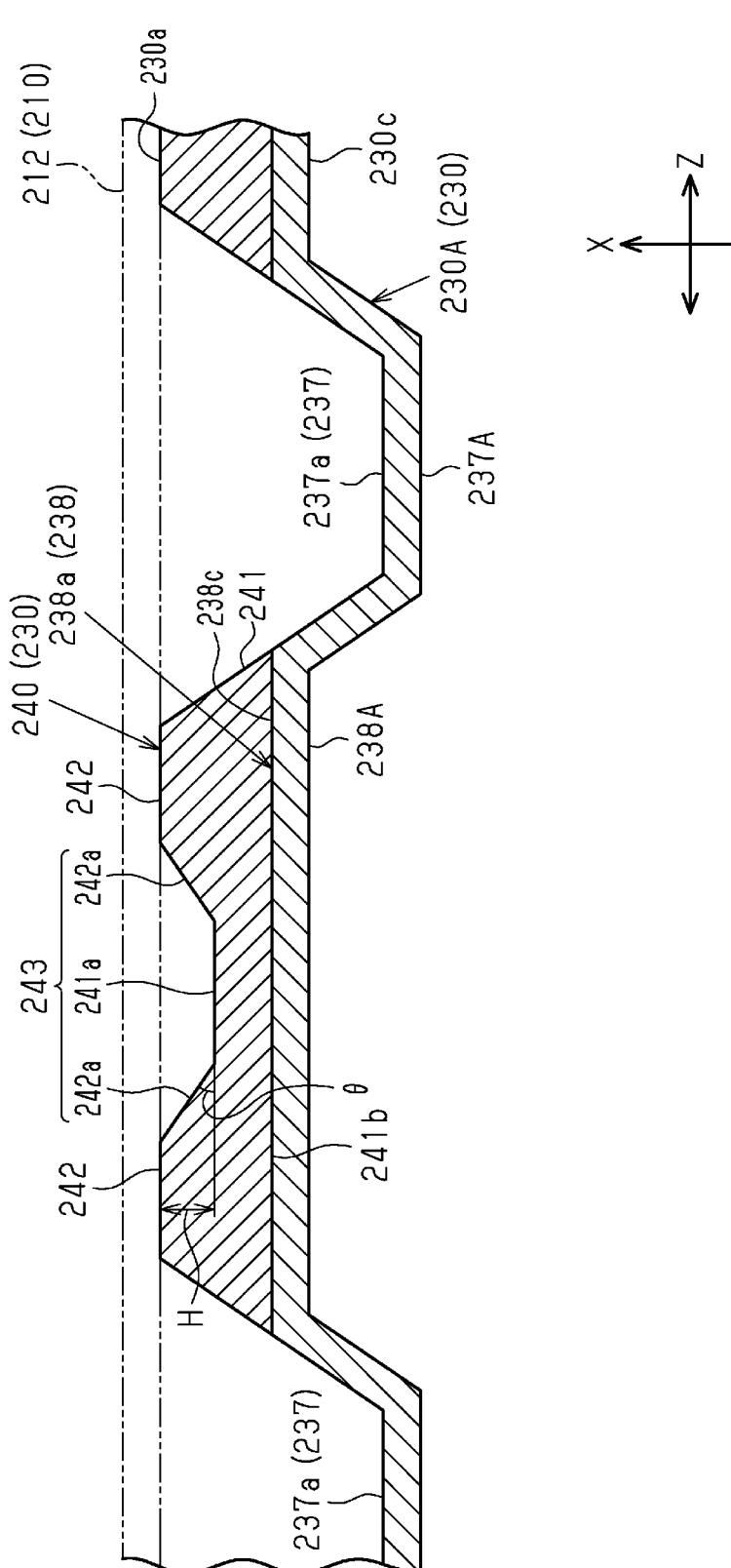
FIG. 10 is a cross-sectional view taken along line 10-10 of FIG. 9.

As shown in FIG. 10, the ribs 238 project toward one side in the first direction X (upward in the up-down direction as viewed in FIG. 10).

In the present embodiment, the ribs 238, of which there are five, are arranged side by side in the third direction Z while being spaced apart from each other, as shown in FIG. 9.

Each rib 238 includes a wavy section 238a, which is provided on the inner facing surface 230a, and extending sections 238b, which extend from the wavy section 238a into the outer facing surface 230b. In the present embodiment, the outermost wavy sections 238a in the third direction Z include sections that are located outside the outer edge of the inner facing surface 230a.

As shown in FIGS. 8 and 10, the base member 230A includes a surface 230c that is on a side opposite to the facing surfaces 230a, 230b in the first direction X. Groove passages 238A, through which cooling medium flows, and ribs 237A located between the groove passages 238A are provided on the surface 230c. The ribs 237A are formed by the back surfaces of the groove passages 237. The groove passages 238A are formed by the back surfaces of the ribs 238. That is, the ribs 237A and the groove passages 238A are in a back-to-back relationship with the groove passages 237 and the ribs 238 on the facing surfaces 230a, 230b (refer to FIG. 10). FIG. 8 illustrates, in a simplified manner, the outer edge of a section that includes the groove passages 238A and the ribs 237A.

The groove passages 238A connect the through-hole 233 and the through-hole 234 to each other. In the groove passages 238A, cooling medium flows in a direction opposite to the flowing direction of the fuel gas flowing through the groove passages 237.

<Contact Members 240>

As shown in FIG. 10, each contact member 240 is configured to contact the GDL 212 of the MEA 210 and is made of a conductive material different from that of the base member 230A. Specifically, the contact member 240 is made of a conductive material that includes a binder that is a thermosetting resin such as an epoxy resin and conductive particles such as carbon particles.

Each contact member 240 includes a base portion 241, which is joined to the corresponding rib 238, and two protrusions 242, which protrude from the base portion 241.

The base portion 241 includes a bottom surface 241a and a contact surface 241b. The bottom surface 241a is located between the protrusions 242, extends in planar directions of the MEA 210, and faces the MEA 210. The contact surface 241b is located on a side opposite to the bottom surface 241a in the first direction X and is joined to the distal surface 238c of the rib 238.

The base portion 241 covers the whole distal surface 238c of the rib 238 in the third direction Z. Each contact member 240 is fixed to the base member 230A by bonding opposite ends of the contact surface 241b in the third direction Z to the distal surface 238c of the corresponding rib 238 with an adhesive (not shown).

The two protrusions 242 are spaced apart from each other in the third direction Z. The two protrusions 242 include inner side surfaces 242a, which rise from the bottom surface 241a in the third direction Z. That is, the contact member 240 includes a recess 243, which is located between the protrusions 242 and is formed by the bottom surface 241a and the two inner side surfaces 242a. The inner side surfaces 242a are inclined such that a given point on each inner side surface 242a separates further away from the bottom surface 241a in the third direction Z as that point approaches the MEA 210 in the first direction X.

A height H from the bottom surface 241a of the base portion 241 to the distal ends of the two protrusions 242 is preferably within a range between 10 μm and 30 μm, inclusive. The height H is more preferably within a range between 20 μm and 30 μm, inclusive. In the present embodiment, the height H is set to be within the range between 20 μm and 30 μm, inclusive.

The inclination angle θ of the two inner side surfaces 242a relative to the bottom surface 241a is preferably within a range between 1 degree and 5 degrees, inclusive. The inclination angle θ is more preferably within a range between 2 degrees and 5 degrees, inclusive. The inclination angle θ is further preferably within a range between 3 degrees and 5 degrees, inclusive. The inclination angle θ is further more preferably within a range between 4 degrees and 5 degrees, inclusive. In the present embodiment, the inclination angle θ is set to be within the range between 4 degrees and 5 degrees, inclusive.

As shown in FIG. 9, the contact members 240 are bonded to both of the wavy sections 238a and the extending sections 238b. Specifically, each contact member 240 is provided over the entire corresponding rib 238 in the extending direction.

The five ribs 238 are respectively provided with the contact members 240.

<Separator 250>

As shown in FIG. 8, the separator 250 is a rectangular plate elongated in the second direction Y.

The separator 250 is formed by pressing, for example, a metal member made of titanium or stainless steel.

The separator 250 is provided on the side of the MEA 210 that corresponds to the cathode 211A. The separator 250 includes a first surface 250a, which includes a surface facing the MEA 210, and a second surface 250b, which is on a side opposite to the first surface 250a.

The separator 250 includes through-holes 251, 252, 253, 254, 255, 256, which are respectively part of the holes 291, 292, 293, 294, 295, 296. In the third direction Z, the through-holes 251, 254, 256 are provided at positions that correspond to the through-holes 221, 224, 226 of the frame member 220. Also, in the third direction Z, the through-holes 252, 253, 255 are provided at positions that correspond to the through-holes 222, 223, 225 of the frame member 220.

As shown in FIG. 8, the separator 250 includes groove passages 257 through which oxidant gas flows and groove passages 258 through which cooling medium flows. FIG. 8 illustrates, in a simplified manner, the outer edge of a section in the separator 250 that includes the groove passages 257 and the outer edge of a section in the separator 250 that includes the groove passages 258.

The groove passages 257 connect the through-hole 255 and the through-hole 256 to each other. In the groove passages 257, the oxidant gas flows in a direction opposite to the flowing direction of the fuel gas flowing through the groove passages 237.

The groove passages 258 connect the through-hole 253 and the through-hole 254 to each other. In the groove passages 258, the cooling medium flows in the same direction as the flowing direction of the oxidant gas flowing through the groove passages 257.

Operation of the second embodiment will now be described.

Figure 11:
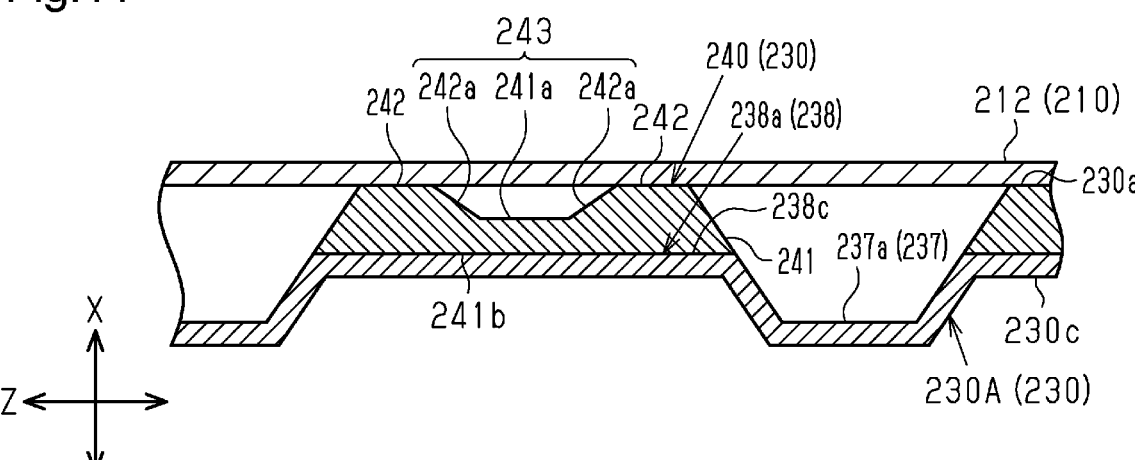
FIG. 11 is a cross-sectional view illustrating a state in which a power generating unit is stacked on a separator according to the second embodiment.
Figure 12:
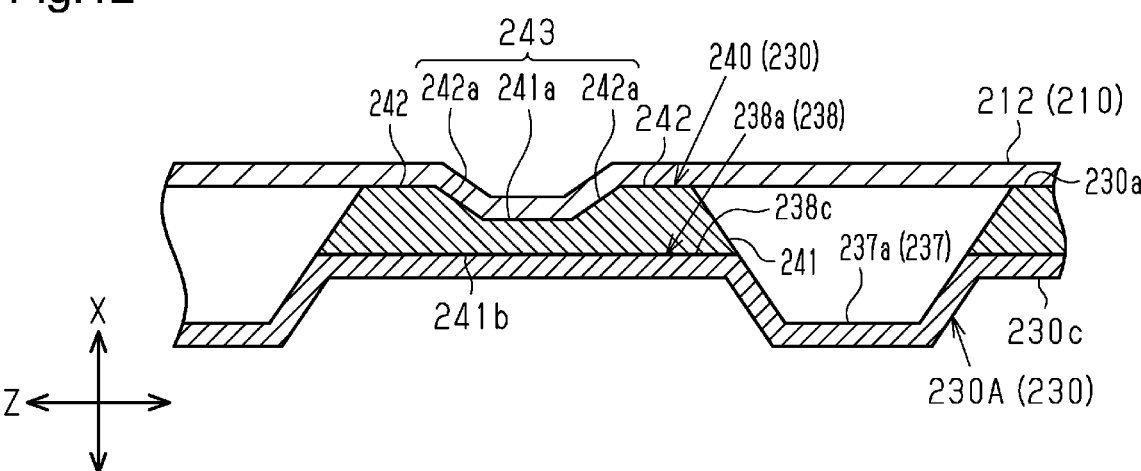
FIG. 12 is a cross-sectional view illustrating a GDL sinking into a recess of a contact member.

As shown in FIG. 11, the separator 230 and the layer including the MEA 210 and the frame member 220 are stacked together to produce the single cell 290 for a fuel cell. In the inner facing surface 230a of the separator 230, the two protrusions 242 of each contact member 240, which are bonded to the wavy section 238a of the rib 238, come into contact with the GDL 212 of the MEA 210. Accordingly, the two protrusions 242 of the contact member 240 sink into the GDL 212 of the MEA 210 as shown in FIG. 12. Also, the GDL 212 sinks into the recess 243, which is formed between the protrusions 242 in the contact member 240. Further, the GDL 212 comes into contact with the bottom surface 241a of the base portion 241. As a result, a section of the GDL 212 that faces the groove passage 237 is in a taut state. FIGS. 11 and 12 illustrate only the GDL 212 in the MEA 210.

Figure 13:
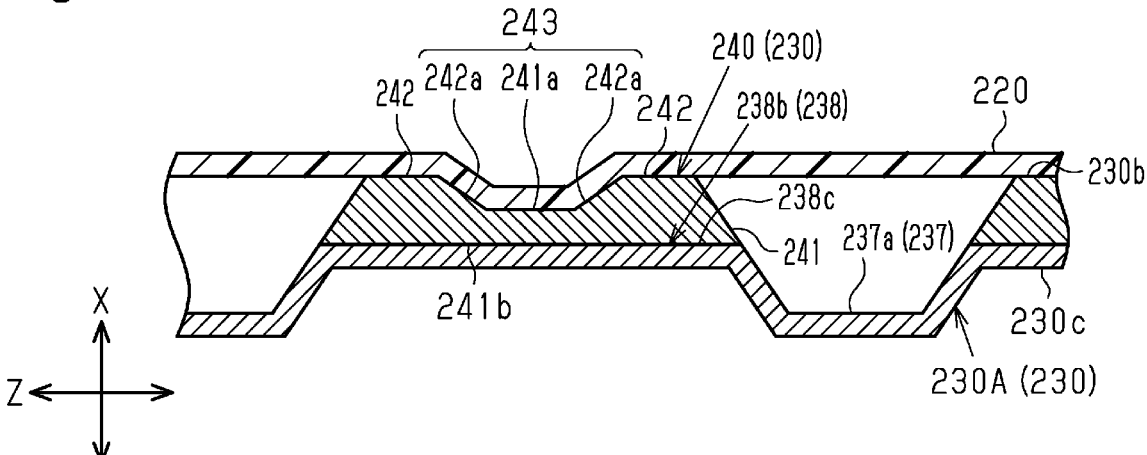
FIG. 13 is a cross-sectional view illustrating a frame member sinking into a recess of a contact member.

On the other hand, on the outer facing surface 230b of the separator 230, the two protrusions 242 of the contact member 240, which are bonded to the extending sections 238b of the ribs 238, come into contact with the frame member 220. Accordingly, the two protrusions 242 of the contact member 240 sink into the frame member 220 as shown in FIG. 13. Also, the frame member 220 sinks into the recess 243, which is formed between the protrusions 242 in the contact member 240. Further, the frame member 220 comes into contact with the bottom surface 241a of the base portion 241. As a result, a section of the frame member 220 that faces the groove passage 237 is in a taut state.

The second embodiment has the following advantages.

(7) The separator 230 includes the base member 230A and the contact members 240. The base member 230A includes the groove passages 237 and the ribs 238, which are located between the groove passages 237 and protrude toward the MEA 210. The contact members 240 are joined to the ribs 238 and contact the MEA 210. Each contact member 240 includes the base portion 241, which is joined to the rib 238, and the two protrusions 242, which protrude from the base portion 241 and are spaced apart from each other in the third direction Z, which is an arrangement direction of the groove passages 237.

This configuration operates in the above-described manner. The GDL 212 is thus restricted from sinking into the groove passages 237.

Also, since the above-described configuration includes the contact members 240, the protruding amount of the ribs 238 of the base member 230A is reduced by the amount corresponding to the height of the contact members 240. This facilitates the molding of the base member 230A of the separator 230 and thus facilitates the manufacture of the separator 230.

(8) The base portion 241 includes the bottom surface 241a located between the protrusions 242. The bottom surface 241a extends in planar directions of the MEA 210 and faces the MEA 210. The two protrusions 242 include inner side surfaces 242a, which rise from the ends of the bottom surface 241a in the third direction Z. The inner side surfaces 242a are inclined such that a given point on each inner side surface 242a separates further away from the bottom surface 241a in the third direction Z as that point approaches the MEA 210 in the first direction X, in which the MEA 210 and the separator 230 face each other.

This configuration allows the GDL 212 to readily sink along the two inner side surfaces 242a as compared to a case in which the inner side surfaces 242a of the two protrusions 242 rise orthogonally from the bottom surface 241a. As a result, a section of the GDL 212 that faces the groove passage 237 is in a taut state. The GDL 212 is thus restricted from sinking into the groove passages 237.

(9) The height H from the bottom surface 241a of the base portion 241 to the distal ends of the two protrusions 242 is within a range between 20 μm and 30 μm, inclusive. The inclination angle θ of the two inner side surfaces 242a relative to the bottom surface 241a is within a range between 4 degrees and 5 degrees, inclusive.

This configuration reliably restricts a clearance from being created between the bottom surface 241a of the base portion 241 and GDL 212 while achieving the advantage of item (8) in a favorable manner.

(10) Each contact member 240 is provided over the entire rib 238 in the extending direction.

With this configuration, the GDL 212 is restricted from sinking into the groove passages 237 over the entire ribs 238 in the extending direction. Also, each rib 238 needs to have only one contact member 240 in the extending direction. This facilitates the manufacture of the separator 230 as compared to a case in which multiple contact members 240 are provided on each rib 238 in the extending direction.

(11) The ribs 238 are respectively provided with the contact members 240.

With this configuration, the GDL 212 is restricted from sinking into each of the multiple groove passages 237.

(12) The separator 230 includes the outer facing surface 230b, which faces the frame member 220. The groove passages 237 include the extending sections 237a, which extend into the outer facing surface 230b. The ribs 238 include the extending sections 238b, which extend into the outer facing surface 230b. The contact members 240 are provided in the extending sections 238b of the ribs 238.

In the fuel cell, the MEA 210 is held by the frame member 220, which is located at the outer periphery of the MEA 210. If the frame member 220 is made of a plastic, portions of the frame member 220 that faces the groove passages 237 may be deformed to bend and sink into the groove passages 237. Like the GDL 212, the sunk frame member 220 acts as resistance to the flow of fuel gas through the groove passages 237 and thus can increase a pressure loss of the fuel gas.

In this regard, the above-described configuration functions in the above-described manner and thus restrict the frame member 220 from sinking into the groove passages 237.

<Modifications>

The second embodiment may be modified as follows. The second embodiment and the following modifications can be combined as long as the combined modifications remain technically consistent with each other.

The shapes of the inlet holes 291, 293, 295 and the outlet holes 292, 294, 296 are not limited to a rectangular shape in plan view as in the second embodiment. For example, the shapes of the inlet holes 291, 293, 295 and the outlet holes 292, 294, 296 may be square or stadium-shaped in plan view.

The flows of the reactant gas and the cooling medium through the holes 291, 292, 293, 294, 295, 296 are not limited to those described in the second embodiment. For example, the hole 296 may be used as an inlet hole for oxidant gas, and the hole 295 may be used as an outlet hole for the oxidant gas. Accordingly, the hole 294 may be used as an inlet hole for cooling medium, and the hole 293 may be used as the outlet hole for the cooling medium. That is, the oxidant gas that flows through the groove passages 257 and the cooling medium that flows through the groove passages 238A, 258 may flow in the same direction as the fuel gas flowing through the groove passages 237.

The number of the groove passages 237 is not limited to six as described in the second embodiment, but may be less than or greater than six.

The separator 230 does not necessarily need to be configured such that the wavy sections 237a have the same shape as described in the second embodiment. That is, the groove passages 237 are not limited to the ones in which the wavelength λ and the amplitude A of the wavy sections 237a are constant over the entire wavy sections 237a in the extending direction. For example, three waves of each wavy section 237a may have different wavelengths λ and different amplitudes A.

The wavenumber of each wavy section 237a is not limited to three as described in the second embodiment, but may be less than or greater than three.

The width, that is, the cross-sectional flow area of each groove passage 237 does not necessarily need to be constant over the entire groove passage 237 in the extending direction, as long as the operation and the advantages of the present disclosure are achieved.

The separator 230 is not limited to the one described in the second embodiment, which has the structure in which the outermost wavy sections 237a in the third direction Z include sections that are located outside the outer edge of the inner facing surface 230a. For example, the wavy sections 237a may be located, in the third direction Z, at the same position as or on the inner side of the outer edge of the inner facing surface 230a. Accordingly, the outermost wavy sections 238a in the third direction Z may be located inside the outer edge of the inner facing surface 230a.

The contact members 240 of the separator 230 do not necessarily need to be provided in the respective the ribs 238 as described in the second embodiment, but may be provided in at least one of the ribs 238.

Figure 14:
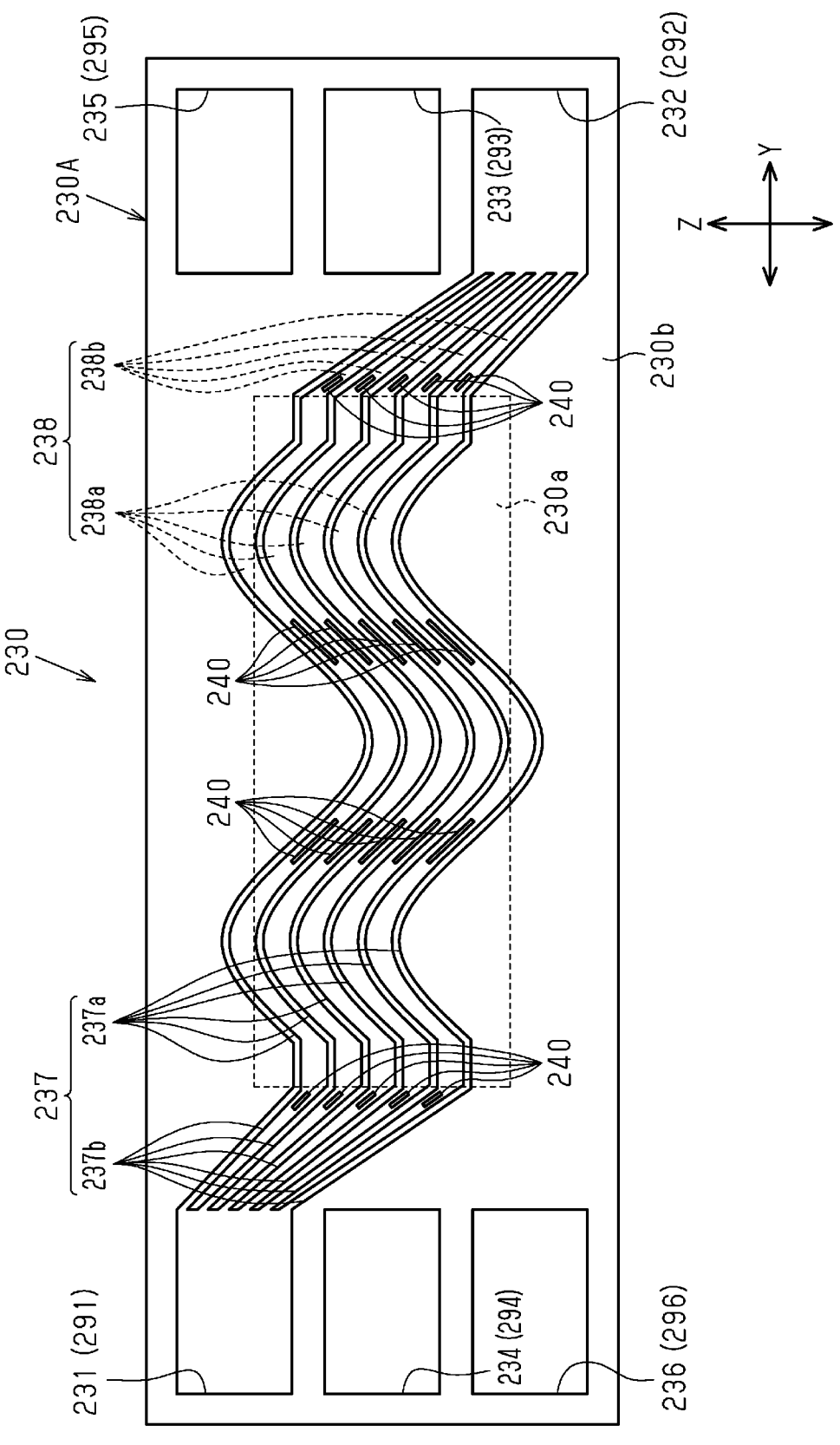
FIG. 14 is a plan view illustrating a separator according to a modification of the second embodiment.

The contact members 240 do not necessarily need to be provided over the entire ribs 238 in the extending direction as described in the second embodiment. That is, as shown in FIG. 14, the separator 230 may be configured such that the contact members 240 are spaced apart from each other in the extending direction of the ribs 238. The separator 230 does not necessarily need to be configured such that the contact members 240 are bonded to both of the wavy sections 238a and the extending sections 238b of the ribs 238. The contact members 240 may be bonded either to the wavy sections 238a or the extending sections 238b. In either case, the separator 230 may be modified as long as the protruding amount of a section of each rib 238 in which the contact member 240 is not provided is increased by the amount corresponding to the height of the contact member 240.

The groove passages 237 do not necessarily need to include the wavy sections 237a, which extend in wavy shapes in planar directions of the inner facing surface 230a as described in the second embodiment. For example, at least one of the groove passages 237 may extend linearly in planar directions of the inner facing surface 230a.

The shape of the contact members 240 is not limited to the one described in the second embodiment, but may be changed in the following manner. That is, the recess 243 of each contact member 240 does not necessarily need to be shaped such that the bottom surface 241a extends in planar directions of the MEA 210 as described in the second embodiment. For example, the recess 243 may have a U-shaped cross-sectional shape. Also, the inner side surfaces 242a of the contact members 240 do not necessarily need to be inclined relative to the bottom surface 241a as described in the second embodiment, but may rise orthogonally from the bottom surface 241a.

The contact members 240 do not necessarily need to be joined to the ribs 238 with an adhesive as described in the second embodiment. For example, the contact members 240 and the base member 230A may be subjected to hot pressing to join the contact members 240 to the ribs 238.

The binder contained in the conductive material of the contact members 240 is not limited to an epoxy resin shown in the second embodiment, but may be a phenol resin. Also, the binder is not limited to a thermosetting resin, but may be a thermoplastic resin such as polypropylene, polyamide, and polyphenylene sulfide.

The contact members 240 may be integrally molded with the ribs 238 by inserting the base member 230A into the molding die and performing injection molding.

The base member 230A of the separator 230 does not necessarily need to be formed by pressing a metal member, but may be formed by cutting or etching.

The material for the base member 230A of the separator 230 is not limited to titanium or stainless steel, but may be aluminum or carbon.

The separator for a fuel cell according to the present disclosure is not limited to the separator 230, which is joined to the side of the MEA 210 that corresponds to the anode 211B as described in the second embodiment, but may be employed in the separator 250, which is joined to the side corresponding to the cathode 211A.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A separator for a fuel cell, the separator comprising:

a facing surface configured to face a power generating unit of the fuel cell; and groove passages through which a reactant gas flows being arranged side by side on the facing surface in an arrangement direction, wherein ribs, which are located between the groove passages and protrude toward the power generating unit, are provided on the facing surface, the ribs include a narrow section of which a width in the arrangement direction is less than widths of other sections of the ribs, at least one of the ribs includes at least one recess in a center of the rib in the arrangement direction of the groove passages, the at least one recess includes a recess provided in the narrow section, and the recess includes:

a bottom surface that extends in a planar direction of the power generating unit and faces the power generating unit; and two inner side surfaces that rise from opposite ends in the arrangement direction of the bottom surface, and the two inner side surfaces are inclined such that a given point on each inner side surface separates further away from the bottom surface in the arrangement direction as that point approaches the power generating unit in a direction in which the power generating unit and the separator face each other.

2. The separator for the fuel cell according to claim 1, wherein a height from the bottom surface of the recess to a distal end of the rib is within a range between 10 μm and 30 μm, inclusive, and an inclination angle of each of the two inner side surfaces relative to the bottom surface is within a range between 1 degree and 5 degrees, inclusive.

3. The separator for the fuel cell according to claim 1, wherein the at least one recess includes recesses that are provided on the facing surface at multiple positions in an extending direction of the ribs.

4. The separator for the fuel cell according to claim 1, wherein the groove passages include a first groove passage and a second groove passage that extend in wavy shapes in a planar direction of the facing surface and are adjacent to each other in the arrangement direction, the ribs include a wavy section located between the first groove passage and the second groove passage, and the wavy section includes the narrow section of which the width of the ribs in the arrangement direction is less than those of other sections of the wavy section.

5. The separator for the fuel cell according to claim 1, wherein the at least one recess includes recesses respectively provided in the ribs.

6. The separator for the fuel cell according to claim 1, wherein the power generating unit is held by a frame member that is located at an outer periphery of the power generating unit, the facing surface includes an inner facing surface, the separator for the fuel cell includes an outer facing surface that faces the frame member, the groove passages and the ribs each include an extending section that extends into the outer facing surface, and the at least one recess includes a recess provided in the extending section of the rib.

7. A single cell for a fuel cell, comprising:

two separators; and a power generating unit that is held between the two separators and includes two gas diffusion layers respectively contacting the two separators, wherein at least one of the two separators is the separator according to claim 1, and the power generating unit sinks into the recess.

8. A separator for a fuel cell, the separator comprising:

a facing surface configured to face a power generating unit of the fuel cell;

groove passages through which a reactant gas flows being arranged side by side on the facing surface in an arrangement direction;

a base member that includes the groove passages and ribs that are located between the groove passages and protrude toward the power generating unit; and a contact member that contacts the power generating unit, wherein the ribs include a narrow section of which a width in the arrangement direction is less than widths of other sections of the ribs, the contact member is joined to one of the ribs, and the contact member includes:

a base portion joined to the rib;

two protrusions that protrude from the base portion and are spaced apart from each other in the arrangement direction; and a recess provided between the protrusions in the narrow section.

9. The separator for the fuel cell according to claim 8, wherein the base portion includes a bottom surface between the protrusions, the bottom surface extending in a planar direction of the power generating unit and facing the power generating unit, the two protrusions each include an inner side surface that rises from an end in the arrangement direction of the bottom surface, and the inner side surface is inclined such that a given point on the inner side surface separates further away from the bottom surface in the arrangement direction as that point approaches the power generating unit in a direction in which the power generating unit and the separator face each other.

10. The separator for the fuel cell according to claim 9, wherein a height from the bottom surface of the base portion to a distal end of each of the two protrusions is within a range between 10 μm and 30 μm, inclusive, and an inclination angle of each of the two inner side surfaces relative to the bottom surface is within a range between 1 degree and 5 degrees, inclusive.

11. The separator for the fuel cell according to claim 8, wherein the contact member is provided on the facing surface over the entire rib in the extending direction.

12. The separator for the fuel cell according to claim 8, wherein the contact member includes contact members respectively provided in the ribs.

13. The separator for the fuel cell according to claim 8, wherein the power generating unit is held by a frame member that is located at an outer periphery of the power generating unit, the facing surface includes an inner facing surface, the separator for the fuel cell includes an outer facing surface that faces the frame member, the groove passages and the ribs each include an extending section that extends into the outer facing surface, and the contact member is also provided in the extending section of the rib.

14. A single cell for a fuel cell, comprising:

two separators; and a power generating unit that is held between the two separators and includes two gas diffusion layers respectively contacting the two separators, wherein at least one of the two separators is the separator according to claim 8, and the power generating unit sinks into a space between the protrusions in the base portion.

15. The separator for the fuel cell according to claim 8, wherein the groove passages include a first groove passage and a second groove passage that extend in wavy shapes in a planar direction of the facing surface and are adjacent to each other in the arrangement direction, the ribs include a wavy section located between the first groove passage and the second groove passage, and the wavy section includes the narrow section of which the width of the ribs in the arrangement direction is less than those of other sections of the wavy section.

16. The separator for the fuel cell according to claim 8, wherein the contact member is a conductive material.

\*    \*    \*    \*    \*